(12) United States Patent
Mundt

(10) Patent No.: US 9,621,697 B2
(45) Date of Patent: Apr. 11, 2017

(54) UNIFIED COMMUNICATIONS IP PHONE USING AN INFORMATION HANDLING SYSTEM HOST

(75) Inventor: Kevin Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 975 days.

(21) Appl. No.: 12/958,043

(22) Filed: Dec. 1, 2010

(65) Prior Publication Data

US 2012/0140763 A1 Jun. 7, 2012

(51) Int. Cl.
*H04L 12/66* (2006.01)
*H04M 1/253* (2006.01)
*H04M 1/247* (2006.01)

(52) U.S. Cl.
CPC ....... *H04M 1/2535* (2013.01); *H04M 1/2471* (2013.01)

(58) Field of Classification Search
CPC .......................... H04M 1/2471; H04M 1/2535
USPC .................................................. 370/350–356
See application file for complete search history.

(56) References Cited

U.S. PATENT DOCUMENTS

| | | | |
|---|---|---|---|
| 6,750,896 B2 | 6/2004 | McClure | |
| 7,023,989 B1 | 4/2006 | Turner et al. | |
| 7,106,298 B1 * | 9/2006 | Turner et al. | 345/156 |
| 7,159,053 B1 | 1/2007 | Lakin | |
| 7,870,496 B1 | 1/2011 | Sherwani | |
| 7,921,185 B2 * | 4/2011 | Chawla | H04L 67/1097 370/351 |
| 8,355,027 B2 * | 1/2013 | Douglas | G06F 3/1431 345/1.1 |
| 2001/0041021 A1 | 11/2001 | Boyle et al. | |
| 2002/0059514 A1 | 5/2002 | Hendry et al. | |
| 2002/0190920 A1 | 12/2002 | Kung | |
| 2003/0025678 A1 | 2/2003 | Lee et al. | |
| 2003/0126335 A1 | 7/2003 | Silvester | |
| 2003/0218632 A1 | 11/2003 | Altwies et al. | |
| 2004/0004603 A1 | 1/2004 | Gerstner et al. | |
| 2004/0070681 A1 | 4/2004 | Battles et al. | |
| 2004/0091095 A1 * | 5/2004 | Weaver | H04M 3/42229 379/211.02 |
| 2004/0202304 A1 * | 10/2004 | Weaver | H04M 3/42229 379/211.02 |
| 2004/0207723 A1 | 10/2004 | Davis et al. | |
| 2005/0099999 A1 * | 5/2005 | Phillips et al. | 370/352 |
| 2005/0135598 A1 * | 6/2005 | Badt et al. | 379/265.09 |

(Continued)

*Primary Examiner* — Khaled Kassim
*Assistant Examiner* — Berhanu Belete
(74) *Attorney, Agent, or Firm* — Terrile, Cannatti, Chambers & Holland, LLP; Robert W. Holland

(57) ABSTRACT

A VoIP telephone provides basic VoIP capabilities, such as those defined by SIP, with an onboard communications engine that presents a user interface at a display. More complex communications capabilities are provided by interfacing the telephone with an information handling system and driving the user interface of the telephone with a UC application executing on the information handling system. For example, the telephone has an LCD that presents a number pad or basic telephone number list for interaction with the communications engine; however, UC application drives a user interface with greater processing power and storage available from the information handling system, such as an address book or communication actions not supported by the communications engine.

20 Claims, 2 Drawing Sheets

(56) References Cited

U.S. PATENT DOCUMENTS

| | | |
|---|---|---|
| 2005/0193143 A1 | 9/2005 | Meyers et al. |
| 2005/0248502 A1 | 11/2005 | Okuley et al. |
| 2006/0019655 A1* | 1/2006 | Peacock ................ H04W 92/02 455/426.1 |
| 2006/0048062 A1 | 3/2006 | Adamson |
| 2006/0114883 A1* | 6/2006 | Mehta ................... H04W 80/04 370/352 |
| 2006/0132473 A1 | 6/2006 | Fuller et al. |
| 2006/0265656 A1* | 11/2006 | Lambert et al. ............. 715/705 |
| 2007/0067498 A1* | 3/2007 | Lippert ................... G09G 5/006 710/1 |
| 2007/0077784 A1 | 4/2007 | Kalayjian et al. |
| 2007/0081196 A1 | 4/2007 | Divine et al. |
| 2007/0086445 A1* | 4/2007 | Mattaway ............. H04L 1/0083 370/352 |
| 2007/0174131 A1* | 7/2007 | Mehta ................... G06Q 30/06 705/26.5 |
| 2007/0180106 A1* | 8/2007 | Pirzada ................. H04L 41/142 709/224 |
| 2008/0062965 A1* | 3/2008 | Silva ..................... H04M 1/247 370/352 |
| 2008/0074403 A1 | 3/2008 | Cho et al. |
| 2008/0159262 A1* | 7/2008 | Crable ................... H04L 12/66 370/352 |
| 2008/0175224 A1* | 7/2008 | Andrews ................ H04L 12/66 370/352 |
| 2009/0046590 A1* | 2/2009 | Boyes ................ H04L 12/2697 370/250 |
| 2009/0253374 A1 | 10/2009 | Matsuo et al. |
| 2009/0322767 A1* | 12/2009 | Douglas et al. ............. 345/520 |
| 2010/0125684 A1 | 5/2010 | Lee |
| 2010/0235787 A1* | 9/2010 | Couse et al. .................. 715/811 |
| 2010/0250770 A1* | 9/2010 | Barreto ................... H04L 49/90 709/231 |
| 2011/0093822 A1 | 4/2011 | Sherwani |
| 2011/0131358 A1 | 6/2011 | Ganesh et al. |
| 2011/0200035 A1* | 8/2011 | Sunstrum ............. H04M 1/2471 370/352 |
| 2011/0243123 A1* | 10/2011 | Munoz-Bustamante et al. ............................. 370/352 |
| 2011/0246904 A1 | 10/2011 | Pinto et al. |
| 2011/0258429 A1* | 10/2011 | Hsu ................... H04W 52/0229 713/100 |
| 2011/0265009 A1 | 10/2011 | Eby et al. |
| 2011/0310030 A1* | 12/2011 | Mundt ................... G06F 1/1647 345/173 |

* cited by examiner

UNIFIED COMMUNICATIONS IP PHONE USING AN INFORMATION HANDLING SYSTEM HOST

BACKGROUND OF THE INVENTION

Field of the Invention

The present invention relates in general to the field of information handling system voice communication, and more particularly to a unified communications IP phone using an information handling system host.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have become a central point of communications for end users. Improvements in processing capabilities and network bandwidth have made common place telephone-like communications through information handling systems. Typically, voice communications through information handling systems rely on Voice over Internet Protocol (VoIP) to communicate voice information between participants through the Internet or other IP based networks. Many enterprises have adopted internal telephone systems that use VoIP telephones to communicate through the enterprise local area network with communication to the POTS (Plain Old Telephone System) supported by a gateway. VoIP telephones are essentially task-specific information handling systems that mimic conventional telephones. Commercial VoIP telephone systems are typically based upon the Session Initiation Protocol (SIP), however, each manufacturer typically adds proprietary features over SIP that make mixing or switching of proprietary VoIP telephone systems difficult. A generic SIP phone can interface with proprietary systems built on the SIP standard, but without the feature set available to proprietary phones. Some examples of such commercial systems include systems sold by Cisco, Aastra, Fonality, Avaya and Nortel. As a result, many enterprises get locked into VoIP telephone systems due to the high cost of replacing all of an existing VoIP system to an alternate system.

One alternative to proprietary SIP-based phones is Unified Communications (UC) phones available from Microsoft, LG, Nortel, Polycom and Cisco, which are typically compatible with a specific UC package. UC phones run a more complex operating system, such as Windows CE, and have features that are a subset of UC features running on a desktop or notebook information handling system. The idea behind a UC application is to intermix voice content, chat text, video and application sharing. UC phones provide a variety of features, however, their interfaces and interoperability with an information handling system tend to be limited and non-intuitive. The additional processing power needed for an operating system and Unified Communications application to execute on the phone increases the expense of phone hardware. Essentially, the phone is a netbook that runs Microsoft Communicator or similar application. An alternative is to simply run Microsoft Communicator on an employee's desktop or portable information handling system, however, the information handling system has to be running to provide phone service.

SUMMARY OF THE INVENTION

Therefore a need has arisen for a system and method which supports client phone software to be phone system agnostic while intuitively supporting conventional telephone calls with and without UC content.

In accordance with the present invention, a system and method are provided which substantially reduce the disadvantages and problems associated with previous methods and systems for interfacing a VoIP phone with an information handling system. A display at the VoIP phone supports stand alone operations, such as basic SIP functionality to place phone calls with a locally-generated user interface presented at the display. An information handling system interfaces with the VoIP phone to provide advanced functionality, such as UC functionality, by driving a user interface for presentation at the display through a peripheral interface and cable coupled to the VoIP phone.

More specifically, an information handling system executes a unified communications application that performs a variety of communication actions, such as VoIP, chat, texting and video conferencing. The information handling system interfaces with a VoIP phone through a peripheral interface, such as a USB or DisplayPort interface, to drive functionality for the communication actions through a user interface presented at a display of the VoIP phone. An end user selects communication actions for execution by the information handling system with inputs made at the phone display. For example, the information handling system presents a number pad or an address book at the phone display and establishes a VoIP phone call based upon inputs made at the phone display. If the information handling system is not coupled to the VoIP phone, then a SIP phone application running locally on a processor of the VoIP phone presents a user interface for communication actions performed locally at the VoIP phone. For example, a locally-generated number pad or address book is presented at the phone display to accept a phone number for the processor of the VoIP phone to use to establish a telephone call.

The present invention provides a number of important technical advantages. One example of an important technical advantage is that a common VoIP telephone supports UC applications from plural vendors without hardware alterations. The telephone display acts as an extend display of an information handling system so that an application running on the information handling system provides the intelligence for UC functions. Processing capability and memory of the telephone are reduced relative to telephones that operate UC applications with an on board operating system and application, however, basic VoIP SIP functions remain available when the telephone is not coupled to an information handling system. For example, in a work environment, end users can use phones in a conventional manner when an information handling system is not interfaced to the phone, but have UC functionality through the phone when an information handling system is interfaced to the phone.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Selectively presenting a user interface at a telephone display that is generated from an information handling system provides greater flexibility in the use of the telephone. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
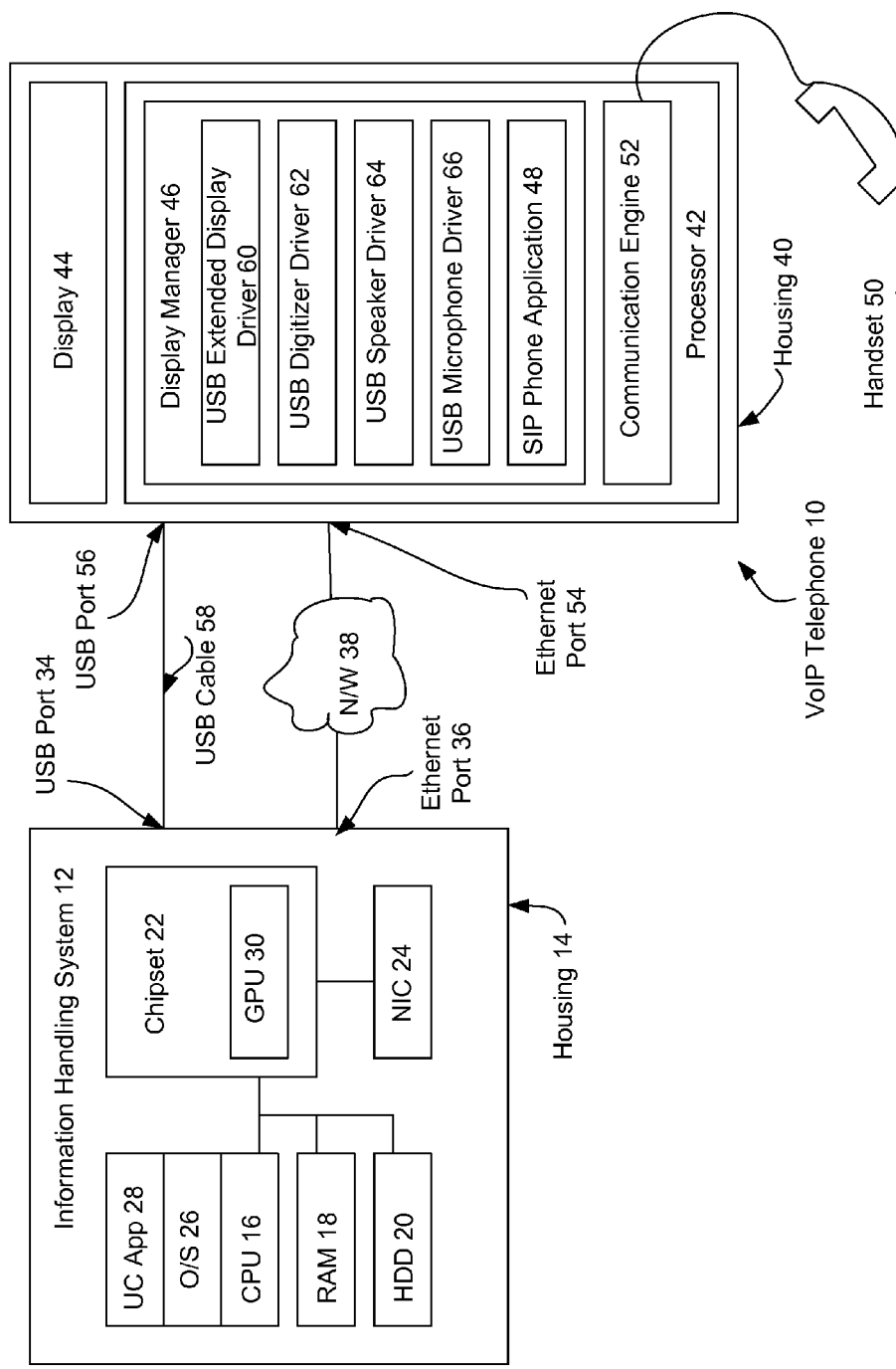
FIG. 1 depicts a block diagram of a VoIP telephone that selectively presents a locally generated user interface or a user interface generated at an information handling system.

Referring now to FIG. 1, a block diagram depicts a VoIP telephone 10 that selectively presents a locally generated user interface or a user interface generated at an information handling system 12. Information handling system 12 has a housing 14 that contains plural processing components that cooperate to process information, such as a CPU 16, RAM 18, a hard disk drive 20, a chipset 22 and a network interface card (NIC) 24. For example, an operating system 26 stored in hard disk drive 20 is called to RAM 18 for execution by CPU 16 for coordinating execution of applications, such as a unified communications application 28, on the processing components. Information generated by operating system 26 and unified communications application 28 is converted to pixel data by a graphics processor 30 managed by chipset 22 for presentation as visual images at a display 32. A peripheral interface port 34, such as a USB port or a DisplayPort port, supports communication between information handling system 10 a peripheral devices external to housing 14.

A network interface 36, such as an Ethernet port or a WLAN card, supports communication between information handling system 10 and a network 38, such as the Internet or a local area network.

VoIP telephone 10 has a housing 40 separate from information handling system 12. A processor 42, such as an ARM processor, executes instructions on VoIP telephone 10 separate from instructions executed on information handling system 12. Display 44 in housing 40 of VoIP telephone 10 presents information under the management of a display manager 46 running on processor 42, such as with a 5 inch touchscreen LCD having resolution of 800×640 pixels. In a stand-alone mode of operation, VoIP telephone 10 supports conventional telephone communications with a SIP phone application 48 running on processor 42, a handset 50 and a communications engine 52 running on processor 42. For example, communications engine 52 establishes communication with network 38 through an Ethernet port 54 of VoIP telephone 10 and presents a number pad or locally-generated phone book at display 44 through SIP phone application 48 of display manager 46. An end user places a VoIP telephone call by interacting with the touchscreen of display 44 to input a telephone number at the number pad or select a number from the phone book. In one alternative embodiment, a conventional telephone number pad with physical buttons may be included in addition to the display touchscreen interface. Communications engine 52 converts analog voice information received at handset 50 into VoIP packets for communication over network 38 and converts VoIP packets received from network 38 into analog voice signals for presentation at handset 50.

VoIP telephone operates as a conventional telephone in a stand-alone mode, however, if information handling system 12 interfaces at a USB port 56 through a USB cable 58, then display manager 46 essentially turns VoIP telephone 10 into a peripheral of information handling system 12 under the control of unified communications application 28. For example, display manager 46 detects an interface with information handling system 12 and in response automatically activates a USB extended display driver 60 to present at display 44 images provided from unified communications application 28. A USB digitizer driver 62 digitizes inputs made by an end user at the touchscreen of display 44 to provide the inputs to unified communications application 28. A USB speaker driver 64 accepts digitized voice information from unified communications application 28 for presentation as audible sounds at handset 50. A USB microphone driver 66 digitizes voice information received at handset 50 for communication to unified communications application 28. In operation, unified communications application 28 presents an image at display 44 that allows an end user to establish a VoIP telephone call, such as a number pad for accepting a telephone number or an address book stored on information handling system 12. The end user initiates the telephone call through inputs at the touchscreen of display 44 that are communicated to unified communications application 28 at information handling system 12 for action. By executing communications actions from information handling system 12 instead of processor 42, greater processing power is available for performing a wider variety of communication actions. However, stand-alone capability at VoIP telephone 10 allows support for telephone communications with basic SIP capabilities enabled through display 44 when not interfaced with information handling system 12, such as placing telephone calls, forwarding calls and holding calls.

In operation, VoIP telephone 10 with a basic ARM processor supports complex unified communication applications by leveraging processing capabilities of an information handling system 12 interfaced through a serial interface, such as USB or DisplayPort. In alternative embodiments, communication between VoIP telephone 10 and information handling system 12 may be supported through alternative interfaces, such as a hardwired or wireless local area network interface. When an end user is logged in at information handling system 12, more advanced functions of unified communications application 28 become available coordinated through display 44, such as chat, texting, video conferencing, etc. . . . An end user can elect to support various communications actions through display 44 or can also use display 32 of information handling system 12. Network communications available through VoIP telephone 10 may be used for communications actions in the event network communications are not available at information handling system 12. In this manner, a single phone will support communication under a variety of unified communication applications depending on the type of application executing on an information handling system so that an enterprise is afforded greater flexibility in the purchase of VoIP phone equipment. Display 44 has operational characteristics similar to those of a smart phone, such as the ability to zoom in on displayed information with a pinching motion at the touchscreen. Any application can display on the telephone display 44 that can scale appropriately to the size of the extended screen. For example, a pinching motion at display 44 acts as a zoom function and a window sizing function so that an application border is sized as though a drag occurs at a corner of the window while the zoom ensures that the application window always fills the display space so that content, such as an address book, can be modified to a size to allow touch inputs or to show greater detail. As a stand-alone phone, VoIP telephone supports public areas and conference rooms with basic SIP functions while allowing authorized individuals to log on with a portable information handling systems for additional UC functionality. For example, in a speaker phone configuration for a conference room, VoIP telephone 10 interacts with a portable information handling system so that a screen image passes through telephone 10 to a projector connected at a USB port of speaker phone to present a video conference under the management of a UC application running on the portable information handling system.

Figure 2:
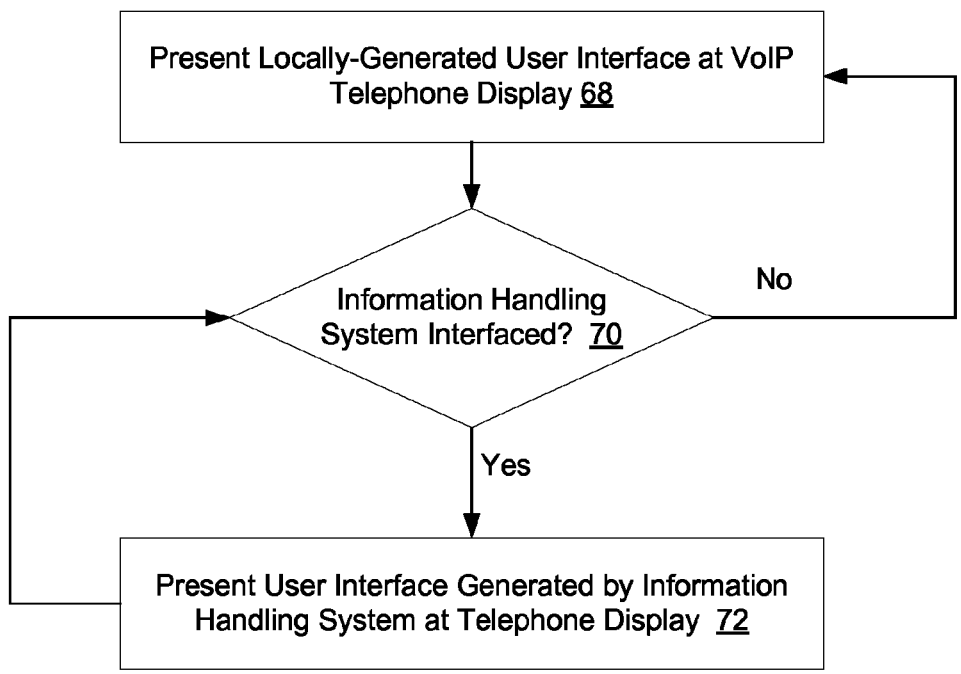
FIG. 2 depicts a flow diagram of a process for selectively presenting a locally generated user interface of a telephone or a user interface generated at an information handling system.

Referring now to FIG. 2, a flow diagram depicts a process for selectively presenting a locally generated user interface of a telephone or a user interface generated at an information handling system. The process begins at step 68 with presentation of a locally-generated user interface at the telephone display, such as will provide SIP functionality in a stand-alone operations mode. At step 70, a decision is made of whether an information handling system is interfaced with the telephone that can provide advanced UC functionality. If not, the process returns to step 68 to operate the telephone in a stand-alone mode. If yes, the process continues to step 72 to present a user interface at the telephone display that will provide UC functionality supported by processing performed at the information handling system. The user interface generated by the information handling system is presented at the telephone display until a decision is made at step 70 that the information handling system is not connected to the telephone.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a peripheral interface port;
processing components disposed in the housing and operable to process information;
a display interfaced with the processing components and operable to present information as images;
a communications application running on the processing components and operable to support plural communications protocols;
a telephone separate from the housing, the telephone having a peripheral interface port, a VoIP communications medium, a display and a communications engine operable to support VoIP communications through the VoIP medium, the peripheral interface port, VoIP communications medium, display and communications engine integrated in one common telephone housing;
a peripheral cable connected at a first end to the housing peripheral interface port and at a second end to the telephone peripheral interface port; and
a display manager executing on the telephone and operable to selectively present information at the telephone display from only one of the communications application or the communications engine, the display manager presenting information from the communications application as a peripheral of the information handling system when the peripheral cable interfaces the housing peripheral interface port and the telephone peripheral interface port or from the communications engine if no interface exists with the communications application.

2. The information handling system of claim 1 wherein the telephone comprises a SIP phone.

3. The information handling system of claim 2 wherein the housing peripheral interface port and the telephone peripheral interface port comprise a USB link.

4. The information handling system of claim 2 wherein the housing peripheral interface port and the telephone peripheral interface port comprise a DisplayPort Link.

5. The information handling system of claim 1 wherein the telephone display comprises a touchscreen and the display manager is further operable to communicate user inputs made at the touchscreen to the communications application as inputs for action by the communications application.

6. The information handling system of claim 1 wherein the telephone supports VoIP communication through a network interface at the telephone.

7. The information handling system of claim 6 wherein the telephone supports VoIP communication through a network interface at the housing when the housing peripheral interface port and the telephone peripheral interface port are electrically coupled through a cable.

8. The information handling system of claim 1 wherein the communications application communication protocols comprise text messaging.

9. A method for coordinating communication through a telephone, the method comprising:
presenting a telephone user interface at a display of the telephone with instructions running on a processor of the telephone, the telephone having a telephone housing that integrates the display and the processor, the telephone housing coupled to a handset that supports end user telephone communication;
interfacing an information handling system with the telephone through a display peripheral cable connected at one end to the information handling system and at an opposing end with the telephone;

selectively presenting a telephone user interface at the display of the telephone with instructions running on a processor of the information handling system, the instructions generating visual information for communication through the peripheral cable for presentation at the display of the telephone by an extended display driver of the telephone.

10. The method of claim 9 further comprising:
accepting end user inputs at a touchscreen of the display;
performing a communications action in response to the end user inputs with the instructions running on the processor of the telephone if the user interface is presented with the instructions running on the processor of the telephone; and
performing a communications action in response to the end user inputs with instructions running on the processor of the information handling system if the user interface is presented with the instructions running on the processor of the information handling system.

11. The method of claim 10 wherein the user interface comprises a number pad and the communications action comprises dialing a telephone number.

12. The method of claim 10 wherein the user interface comprises a telephone directory and the communications action comprises dialing a telephone number from the telephone directory.

13. The method of claim 10 wherein the communications action comprises initiating a VoIP telephone call.

14. The method of claim 9 wherein interfacing an information handling system with a telephone comprises driving a display presentation from the information handling system to the telephone through a USB cable.

15. The method of claim 9 wherein interfacing an information handling system with a telephone comprises driving a display presentation from the information handling system to the telephone through a DisplayPort cable.

16. A VoIP telephone comprising:
a housing;
a network interface disposed at the housing and operable to communicate VoIP information;
a communications engine integrated in the housing and operable to communicate voice information through the network interface;
a peripheral interface disposed at the housing and operable to communicate with an information handling system;
a display integrated in the housing and operable to present a user interface having at least one communication action;
a remote display driver integrated in the housing and operable to receive visual information generated by an information handling system external to the housing for presentation at a peripheral device and to present the visual information at the display as a peripheral of the information handling system; and
a display manager integrated in the housing and interfaced with the display, the peripheral interface and the communications engine, the display manager operable to selectively present at the display a user interface generated by the communications engine or a user interface generated at an information handling system and communicated to the display through the peripheral interface for presentation by the remote display driver.

17. The VoIP telephone of claim 16 wherein the communication action comprises dialing a telephone number, the user interface generated by the communications engine comprises a number pad and the user interface generated by the information handling system comprises a number pad.

18. The VoIP telephone of claim 16 wherein the communication action comprises dialing a telephone number, the user interface generated by the communications engine comprises a list of telephone numbers and the user interface generated by the information handling system comprises an address book.

19. The VoIP telephone of claim 16 wherein the communication action comprises dialing a telephone number, the user interface generated by the communications engine comprises a number pad and the user interface generated by the information handling system comprises an address book.

20. The VoIP telephone of claim 16 wherein the peripheral interface comprises a USB port.

\* \* \* \* \*